(No Model.) 2 Sheets—Sheet 1.

H. C. BAILEY.
BLANK SLITTING MACHINE.

No. 417,216. Patented Dec. 17, 1889.

WITNESSES.
Jacob W. Loeper
E. B. Griffith

INVENTOR.
Henry C. Bailey
By C. P. Jacobs
Atty.

N. PETERS. Photo-Lithographer, Washington, D. C.

(No Model.)
2 Sheets—Sheet 2.
H. C. BAILEY.
BLANK SLITTING MACHINE.
No. 417,216. Patented Dec. 17, 1889.
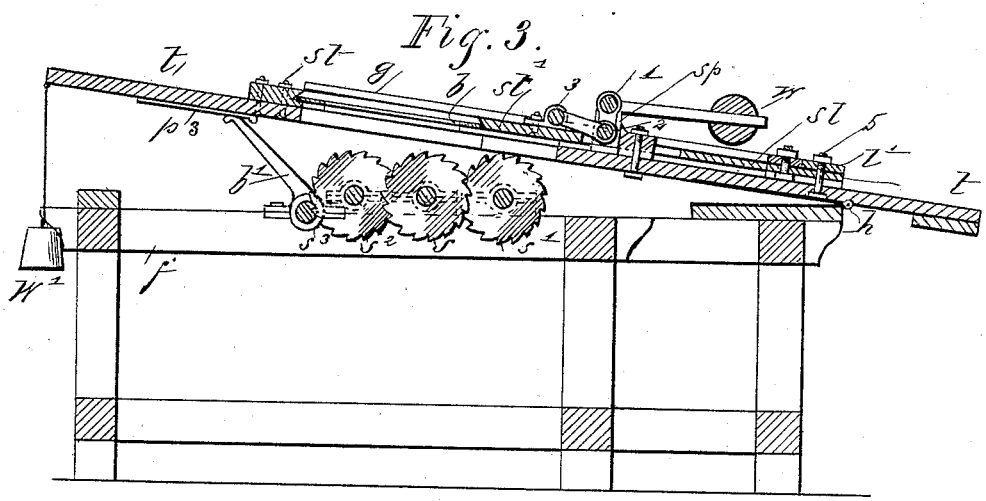
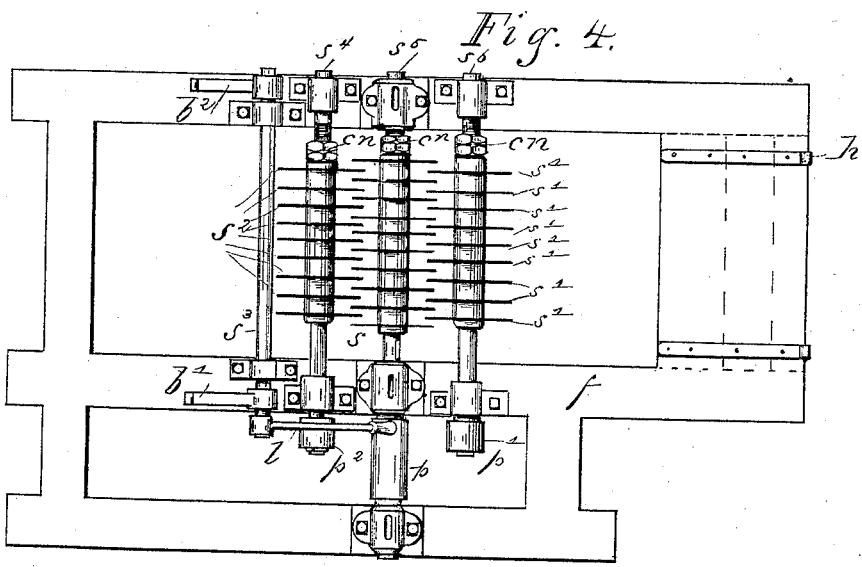
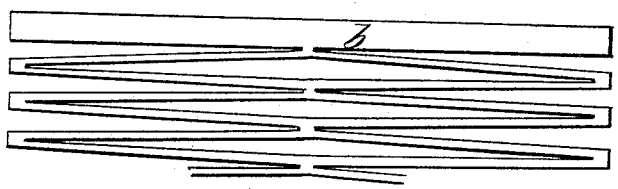
WITNESSES.
Jacob W. Loeper
E. B. Griffith
INVENTOR.
Henry C. Bailey
By C. P. Jacobs
Atty.

UNITED STATES PATENT OFFICE.

HENRY C. BAILEY, OF EDINBURG, INDIANA.

BLANK-SLITTING MACHINE.

SPECIFICATION forming part of Letters Patent No. 417,216, dated December 17, 1889.

Application filed September 19, 1889. Serial No. 324,408. (No model.)

*To all whom it may concern:*

Be it known that I, HENRY C. BAILEY, of Edinburg, county of Johnson, and State of Indiana, have invented certain new and useful Improvements in Blank-Slitting Machines; and I do hereby declare that the following is a full, clear, and exact description thereof, reference being had to the accompanying drawings, in which like letters and figures refer to like parts.

My invention relates to the construction of machines for sawing slits in wooden blanks, door-mats, chair-seats, and other articles, and will be understood from the following description.

Figure 1:
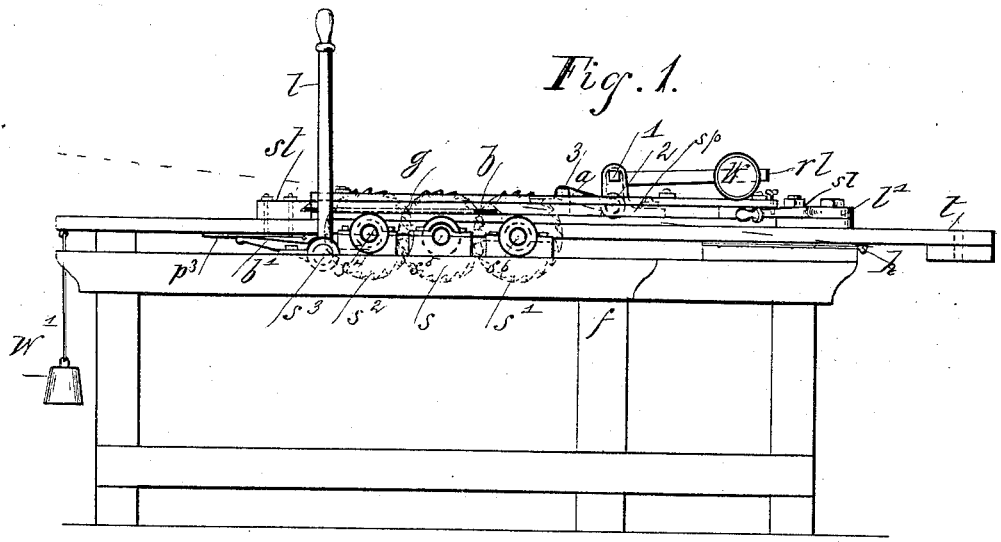
Figure 2:
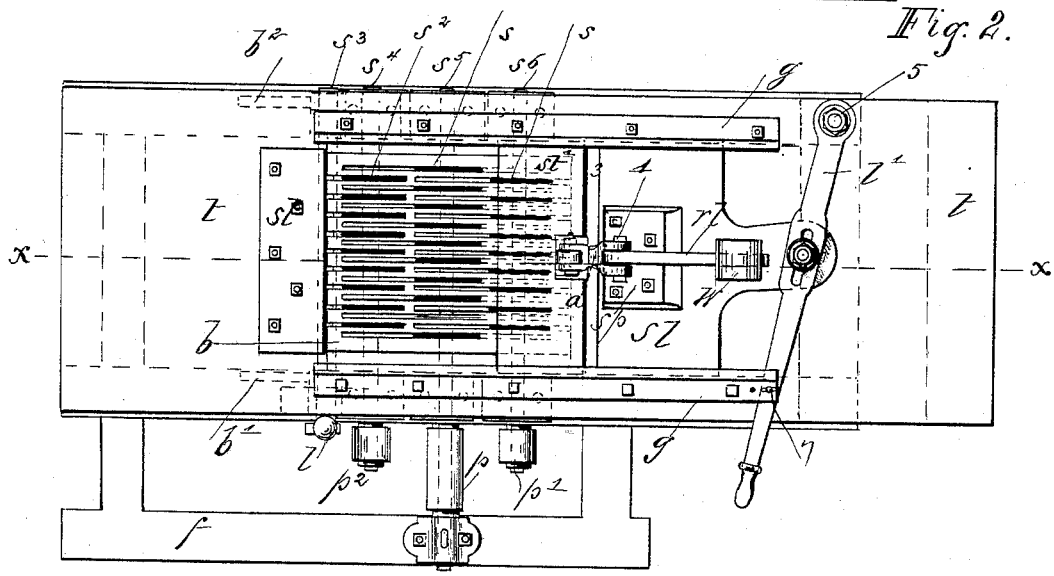

In the drawings, Figure 1 represents a side view of my machine when the table is let down and the sawing of the blank is completed. Fig. 2 is a top view of the same. Fig. 3 is a central longitudinal section on the line $x\ x$, Fig. 2, showing the table lifted after the sawing of the blank has been completed. Fig. 4 is a top view of my machine, the table unhinged and removed. Fig. 5 is a view of a part of the blank after the sawing has been completed and expanded, showing the slits.

In detail the machine comprises a supporting frame-work $f$, in which are journaled shafts $s^4\ s^5\ s^6$, carrying saws $s\ s'\ s^2$, the central saws $s$ carried upon the main shaft $s^5$, upon whose outer end is mounted a driving-pulley $p$. Auxiliary driving-pulleys $p'\ p^2$ are mounted on the other shafts, as shown in Fig. 4.

$cn$ are nuts threaded to work upon the saw-shafts for locking the saws in position. The saws, as will be seen, are arranged so that the outer ones on each side work between the saws upon the inner or main shaft.

$t$ is a table, which is hinged at $h$ to one end of the frame, having a bearing-plate $p^3$ beneath and near the opposite end, against which moves a brace $b'$, rigidly connected to an operating-lever $l$, by means of which the table is lifted.

$w'$ is a weight for gradually drawing down the table in position as the brace $b'$ slides along the bearing-plate. This weight makes a constant pressure upon the table $t$ as it is being let down upon the saws, as will be hereinafter described.

The blank to be sawed may be of any desired size, usually about half an inch in thickness, and of any kind of wood, and is intended to be sawed in the manner shown in Fig. 5. A cut is made from each end by the outside saws stopping a short distance of the center, leaving a solid block therein. The next slit is made by the center saws, and is not cut through to the ends, but a part of the wood is left solid at each end, and the cut extends from within a short distance of one end nearly to the other, and these cuts are such as to leave between every central slit a solid piece at the center of the wood, and between the others a solid piece at each end, so that the blank may be extended, opening the slits in the manner shown in Fig. 5.

The table $t$ is hinged to the frame-work at $h$, as hereinbefore described, so that its opposite end may be raised and lowered by means of the lever $l$ and its connections. Upon the top of this table are mounted guides $g$, between which moves a slide $sl$, operated by the lever $l'$, pivoted at 5 to the table. By pulling upon this lever the slide is pushed forward, carrying with it the blank, as hereinafter described. The slide $sl$ has a plate $sp$ connected to its top, which is provided with lugs, through which pass a pivot-bolt 1, connecting a right-angle lever $rl$ thereto, and the lower end of this lever is pivoted at 2 to the arm $a$, which is in turn pivoted at 3 to the stop $st'$. This stop is slotted at its forward end a part of its way, as shown in Fig. 2, so that the adjacent saws $s'$ may pass up through it as they cut the blank. The inner ends of the edge of this stop is preferably slightly beveled, as shown in Fig. 3, and is crowded up against the edge of the blank by the leverage of the lever $rl$, which has a weight $w$ mounted thereon, and by throwing down this weight this lever operates to force the stop $st'$ against the edge of the blank $b$, crowding the latter up against the rigid stop $st$, bolted to the table on the opposite side, so that the blank to be operated upon by the saws is firmly held between these stops by means of the leverage of the weighted lever hereinbefore mentioned.

The blank is set and locked in position upon the slide, while the table is raised above the saws by means of the lever $l$, and when everything is ready, power being applied, the operator gradually lets the table down, carrying the blank, which is in such relative position that the central saw will first strike the end of the blank when the table falls to the proper point, and as it cuts through the operator takes hold of the lever $l'$, pushes forward the slide and blank so that the central saws will cut through the other half of the blank along the line of their kerf, and at the same time the rear and front saws will cut their respective kerfs on the sides of the cut made by the central saws—that is, after the central saw has cut through about one-half of the length of the blank, which is about the diameter of such saw, by sliding the blank along, the side saws cut each one-half of the slit on either side thereof, so that the forcing along of the blank by means of the slide, so as to let the central saw cut the entire length of its kerf, does not affect the cutting of the saws on either side, and the central block between the slits will not be cut through.

The slits are all cut quickly by one and the same operation, and as soon as it is completed the table is lifted and the blank removed and another set in place. In order that there may be no further forward movement than is necessary to cut the slits the required length, a stop 7 is connected with the lever $l$, as shown in Fig. 2, and when this lever has reached the proper limit of its forward movement its movement will be arrested, so that there will be no risk of cutting the slits through the end or center pieces, as might otherwise happen.

Nothing is claimed in this application on the blank itself, it being the subject-matter of an application heretofore filed, and the invention herein described relates solely to the machine for slitting these blanks, which are adapted for making chair-backs, seats, stair-treads, and other articles.

What I claim as my invention, and desire to secure by Letters Patent, is the following, viz:

1. A machine for slitting blanks, comprising a frame-work, a series of saws mounted on axles journaled in bearings upon such frame, such saws set in proper relative position with respect to each other, a table hinged to such frame-work, a slide moving therein, suitable mechanism connected with such slides for locking the blank in position to be operated upon, and means, substantially as shown, for raising and lowering such table and blank upon the saw-slitting mechanism, substantially as shown and described.

2. A blank-slitting machine comprising a frame-work, one or more series of saws mounted on axles journaled in bearings thereon, driving-pulleys connected to such axles, a table supported above such frame-work, carrying a sliding and locking frame for receiving and holding the blank, with means for lowering such table upon and lifting it away from the sawing mechanism, substantially as shown and described.

3. A blank-slitting machine comprising a frame-work, saws mounted upon axles journaled in bearings thereon, a table hinged to such frame, mechanism for lifting such table connected therewith, a sliding and locking mechanism for holding the blank while it is being operated upon, a counter-balance carried upon such table for creating a uniform pressure, and means for operating the same, all combined substantially as described.

In witness whereof I have hereunto set my hand this 16th day of September, 1889.

HENRY C. BAILEY.

Witnesses:
FRANK MAYFIELD,
JOHN SANDERS.